United States Patent

[11] 3,618,587

[72] Inventor Maurice W. Lee, Sr.
P.O. Box 25, Boley, Okla. 74829
[21] Appl. No. 843,049
[22] Filed July 18, 1969
[45] Patented Nov. 9, 1971

[54] GREASE PRESSURE-PULSING COOKER
5 Claims, 4 Drawing Figs.
[52] U.S. Cl............................................ 126/389,
23/290.5, 99/1, 99/107, 99/325, 99/348, 99/403
[51] Int. Cl...................................................... A47j 27/08
[50] Field of Search.......................................... 126/369,
389, 369.1; 23/280, 290.5; 99/1, 259, 325, 348,
403, 107

[56] References Cited
UNITED STATES PATENTS
225,584   3/1880   Flanders...................... 126/369

| 452,901 | 5/1891 | Austin | 126/389 X |
| 1,935,108 | 11/1933 | Brooks | 126/389 |
| 2,184,671 | 12/1939 | Hollander | 126/389 UX |
| 2,827,379 | 3/1958 | Phelan | 126/369.1 UX |

Primary Examiner—Frederick L. Matteson
Assistant Examiner—Robert A. Dua
Attorney—Robert K. Rhea ABSTRACT: A deep well grease pressure-frying appliance with an electrical circuit including a pressure-responsive switch and a electromagnetic vent valve for intermittently venting the vessel into a bottom chamber so as to provide periodic pressure pulsations or surges in the grease, which provides quicker and deeper penetration of the grease into a food article contained in the vessel.

GREASE PRESSURE-PULSING COOKER

This invention relates to means for pressure cooking food articles, and more particularly to a pressure-frying appliance provided with means for generating periodic pressure pulsations or surges in its cooking space for the purpose of providing quicker and deeper penetration of grease or other cooking medium employed into a food article contained in the appliance.

A main object of the invention is to provide a novel and improved pressure fryer which is relatively simple in construction, which contains a minimum number of parts, and which is arranged to provide periodic pressure pulsations or surges in its cooking well so as to facilitate cooking action.

A further object of the invention is to provide an improved deep well grease pressure-frying appliance which is inexpensive to manufacture, which is durable in construction, and which operates on a new and improved cooking principle, namely, that of exposing a food article to periodically recurring pressure pulsations of the cooking medium employed so as to make the cooking action more efficient and to speed up the cooking action provided by the hot medium.

A still further object of the invention is to provide an improved pressure fryer which generates periodic pulses or surges of pressure in its cooking space and which thereby facilitates the cooking action provided thereby, the device being relatively compact in size, being safe to operate, and being adjustable to provide a wide range of desired cooking effects so that it can be readily adjusted in accordance with the size or quantity of food articles to be cooked therein.

Further objects and advantages of the invention will become apparent from the following description and claims, and from the accompanying drawings, wherein:

Figure 1:
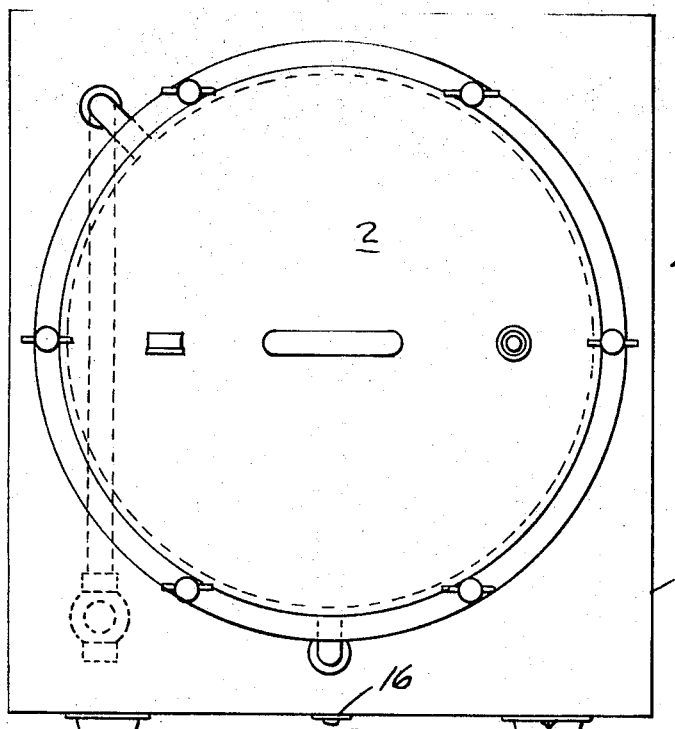
FIG. 1 is a top plan view of an improved intermittent-pressure deep well fryer constructed in accordance with the present invention.
Figure 2:
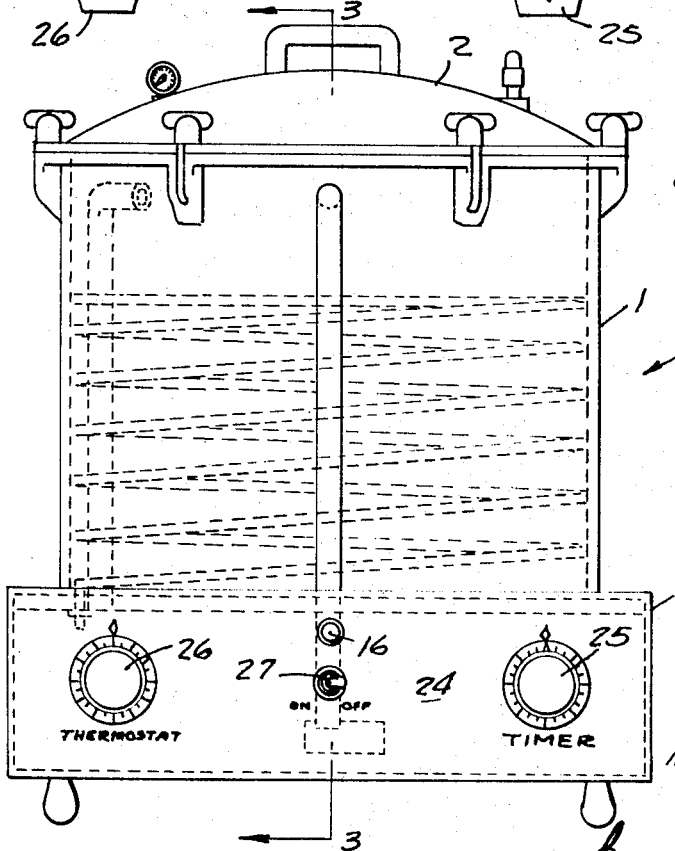
FIG. 2 is a front elevational view of the cooking apparatus shown in FIG. 1.
Figure 3:
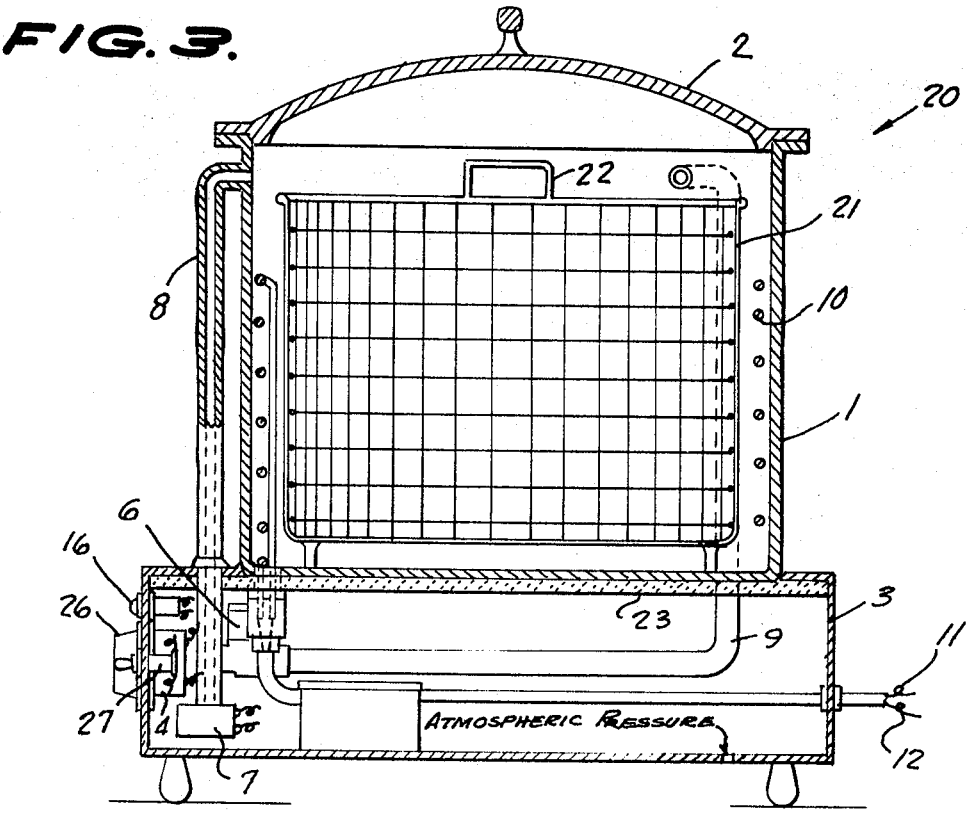
FIG. 3 is a transverse vertical cross-sectional view taken substantially on the line 3—3 of FIG. 2.

Referring to the drawings, 20 generally designates an improved pressure-frying appliance constructed in accordance with the present invention. The appliance 20 comprises a deep well vessel 1 which is mounted on a hollow base 3, the vessel 1 being provided with the detachable pressuretight lid 2 of conventional construction. The pressure vessel 1 is provided with a conventional internal heating coil 10 which is suitably mounted and is suitably insulated from the vessel by conventional means, not shown. Thus, the heating coil 10 may comprise a plurality of turns located adjacent the inside wall surface of the vessel 1 and may be arranged to extend for a substantial height inside the vessel. The vessel is adapted to receive a conventional wire rack 21 for supporting a food article, or articles, in a quantity of grease contained in the vessel. The rack 21 may be provided with lifting handles 22 to facilitate the placement of the rack in the vessel 1, and the removal therefrom.

A vent conduit 8 connects the upper portion of the vessel 1 to the interior of the hollow base 3 through a normally open magnetic valve 7, the valve closing responsive to the energization of its winding. A pressure-sensing conduit 9 is provided in the vessel 1, said conduit extending into the hollow base 3 and being connected to a conventional pressure-responsive switch 6 which is illustrated diagrammatically in FIG. 4, and which is normally closed, said switch opening when the pressure in the vessel 1 rises to a predetermined value. The pressure-sensing conduit 9 passes sealingly through the bottom wall of the vessel 1 and through a heat-insulating top layer 23 provided in the hollow base 3.

The hollow base 3 is provided with a front panel 24 on which is mounted a conventional timer 5 and a conventional adjustable thermostatic switch 4, the timer being provided with the adjusting knob 25 and the thermostat being provided with the adjusting knob 26. Also mounted on front panel 24 is a main control switch 27 and a pilot light 16.

Figure 4:
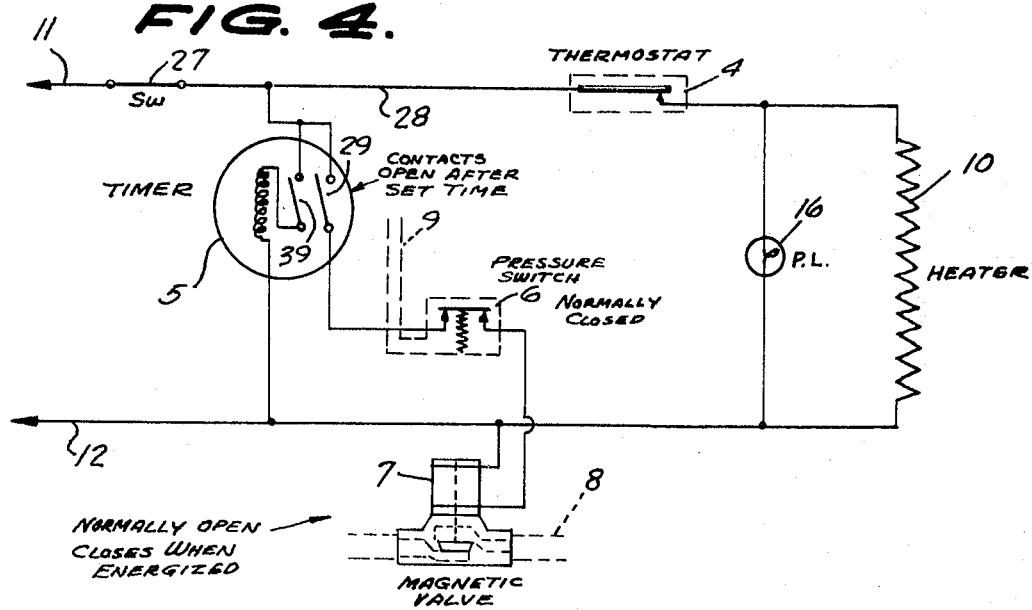
FIG. 4 is an electrical wiring diagram showing the connections of the various electrical components of the cooking appliance shown in FIGS. 1, 2 and 3.

As shown in FIG. 4, one terminal of the heating winding 10 is connected to a first line wire 11 through the thermostatic switch 4 and the main control switch 27, the connection including a wire 28 connecting switch 27 to thermostat 4. The opposite terminal of the heating winding 10 is connected to a second line wire 12. The operating winding of the timer 5 is connected across the wires 12 and 28 through one set of timed contacts 39. One terminal of the winding of magnetic valve 7 is connected to wire 28 through pressure switch 6 and the other set of timed switch contacts 29, the opposite terminal of said winding being connected to the line wire 12. Thus, the contacts 29 of the timer will open at a preset time after the timer has been placed in operation, as determined by the setting of the timer control knob 25. The timer 5 is of a conventional type which automatically resets, namely, restores its contacts 29 and 39 to open condition, when its operating winding is deenergized.

As will be seen from FIG. 4, the pressure-responsive switch 6 is connected in series with the timer contacts 29 so that the magnetic valve winding becomes energized and deenergized responsive either to the closure and opening of the timer contacts 29 or the closure and opening of the pressure switch contacts.

The pilot light 16 is connected across the heater winding 10 so the pilot light 16 is energized concurrently with the energization of said heater winding. The adjustment of the thermostat control knob 26 determines the effective operating temperature within the vessel 1.

The hollow base 3 is at atmospheric pressure, so that the opening of the valve 7 effectively vents the interior of vessel 1 to atmospheric pressure.

In operation, with the cover 12 clamped in sealing position on the vessel, and with a quantity of grease contained therein surrounding a food article supported in the rack 21, the closure of the switch 27 causes the heater winding 10 to become energized and to raise the interior of the vessel 1, including the grease contained therein, to a desired cooking temperature, for example, a temperature of approximately 375° in accordance with the setting of the thermostat control knob 26. It will be understood that this preheating of the grease may be performed prior to the placement of the wire basket 21 containing the food article to be cooked in the vessel. In other words, before placing the cover 2 on the vessel 1 the interior thereof may be preheated to the desired cooking temperature, after which the rack 21 containing the food article, for example, a chicken, or the like, is placed in the vessel and lowered into the hot grease. The lid 2 may then be fastened in sealing position on the top of the vessel 1. The timer 5 may be set (contact pairs 39 and 29 are closed) to a desired cooking time, for example a cooking time of the order of 5 minutes, or less. As the deep frying takes place, pressure builds up inside vessel 1 as the moisture evaporates from the chicken, or similar food article, contained in the wire basket 21. When the pressure builds up to a predetermined value, for example, a value of the order of 15 pounds per square inch inside the vessel 1, the pressure switch 6 opens its contacts, deenergizing the winding of the magnetic valve 7, causing the valve to open, which quickly lowers the pressure within the vessel 1. This releases the pressure switch 6, allowing it to close its contacts and to thereby again energize the winding of the magnetic valve 7, which thus closes and again allows the pressure inside the vessel 1 to build up. This cycle is repeated throughout the cooking process, thus causing substantial turbulence in the grease and causing the hot grease to more readily penetrate into the food article being cooked than would occur without such turbulence. The cycling of pressure conditions inside the vessel 1 creates impact in the grease, producing considerable turbulence because the magnetic valve 7 opens and closes in a relatively rapid manner.

At the end of the preset cooking time, the contacts 29 of the timer open, deenergizing the winding of the magnetic valve which causes the valve to open and to thus release the pressure in the cooking vessel 1. The lid 2 may then be removed and the basket 21 containing the cooked chicken, or other food article, may then be lifted out of the vessel.

As above-mentioned, the pressure cycling effect, with the resultant agitation and turbulence of the hot grease lowers the amount of required cooking time substantially, namely, by as much as one or more minutes, as compared with the cooking time required in conventional pressure fryers.

It will be readily understood that the provision of the exhaust conduit 8 connecting the container 1 to the hollow base is an important safety feature, since it enables the pressure vessel 1 to be exhausted into a relatively confined space rather than into the atmosphere externally adjacent to the appliance. Thus, the hollow base 3 acts as a muffler wherein the high-pressure vapor from the pressure vessel 1 can discharge and wherein its pressure can be safely dissipated. XX While a specific embodiment of an improved pressure-cooking appliance has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a pressure-cooking appliance, a pressure vessel,
   means to elevate the vessel to a cooking temperature, and
   means to intermittently exhaust the pressure vessel during a cooking period including a vent valve of the electromagnetic type provided with an operating winding holding the valve closed when energized, and
   means comprising an energizing circuit connected to said winding and including a normally closed pressure-responsive switch communicatively connected to the pressure vessel to open said vent valve when the pressure in the vessel reaches a predetermined value.

2. The pressure-cooking appliance of claim 1, and further means to open said energizing circuit after a predetermined cooking time period.

3. The pressure-cooking appliance of claim 2, and wherein said further means comprises time-controlled switch means. X 4. The pressure-cooking appliance of claim 1, and further including a hollow base supporting said pressure vessel for forming an exhaust chamber,
   and wherein the means to exhaust the pressure vessel further includes conduit means communicatively connecting the vessel to said exhaust chamber through said vent valve.

5. The pressure-cooking appliance of claim 4, and wherein said switch is mounted within said hollow base.

* * * * *